US012642735B2

(12) United States Patent
Lee et al.

(10) Patent No.: US 12,642,735 B2
(45) Date of Patent: Jun. 2, 2026

(54) STRUCTURAL ENERGY STORAGE FOR CF BASED PERSONAL MOBILITY AND LIGHTWEIGHT DELIVERY

(71) Applicant: TOYOTA MOTOR ENGINEERING & MANUFACTURING NORTH AMERICA, INC., Plano, TX (US)

(72) Inventors: Jae Seung Lee, Ann Arbor, MI (US); Paul Gilmore, Ann Arbor, MI (US)

(73) Assignee: TOYOTA MOTOR ENGINEERING & MANUFACTURING NORTH INC., Plano, TX (US)

( * ) Notice: Subject to any disclaimer, the term of this patent is extended or adjusted under 35 U.S.C. 154(b) by 1094 days.

(21) Appl. No.: 17/574,685

(22) Filed: Jan. 13, 2022

(65) Prior Publication Data
US 2023/0218468 A1     Jul. 13, 2023

(51) Int. Cl.
*A61H 3/04*          (2006.01)
*A61G 5/04*          (2013.01)
(Continued)

(52) U.S. Cl.
CPC ............. *A61H 3/04* (2013.01); *A61G 5/041* (2013.01); *A63B 43/00* (2013.01); *A63C 11/26* (2013.01); *H01M 50/229* (2021.01); *A61H 2003/043* (2013.01); *A61H 2201/5064* (2013.01); *A61H 2201/5071* (2013.01); *A63B 2220/35* (2013.01); *A63B 2243/0054* (2013.01)

(58) Field of Classification Search
CPC ............. H01M 50/247; H01M 50/249; H01M 50/256; H01M 2220/20; H01M 2220/30; A61G 5/041
See application file for complete search history.

(56) References Cited

U.S. PATENT DOCUMENTS 5,494,126 A  *  2/1996  Meeker ................. A61G 5/047
                                                          180/907
7,750,790 B2    7/2010  Yang et al.
                        (Continued)

FOREIGN PATENT DOCUMENTS

CN       107926117 B      8/2020
EP         0635423 A1  *  1/1995
KR      10-1632109 B1     6/2016

OTHER PUBLICATIONS

Till Julian Adam, et al., "Multifunctional Composites for Future Energy Storage in Aerospace Structures", Energies, vol. 11, Issue 2: 335, 2018, pp. 1-21.

*Primary Examiner* — Matthew J Merkling
(74) *Attorney, Agent, or Firm* — Oblon, McClelland, Maier & Neustadt, L.L.P.

(57)          ABSTRACT

A mobile apparatus includes a motion action portion. The motion action portion including a frame portion, at least part of the frame portion including a structural battery, the structural battery including one or more energy storage devices. Each of the one or more energy storage devices having at least one anode core of a continuous carbon fiber, an electrolyte arranged on the at least one continuous carbon fiber core, and a cathode layer arranged to the at least one continuous carbon fiber core on the electrolyte, and at least one interface electrically connected to the structural battery, the interface for inputting power for charging the structural battery and for outputting power.

6 Claims, 24 Drawing Sheets

<u>800</u>

(51) Int. Cl.
    *A63B 43/00*       (2006.01)
    *A63C 11/26*       (2006.01)
    *H01M 50/229*    (2021.01)

(56)               References Cited

U.S. PATENT DOCUMENTS

| | | | |
|---|---|---|---|
| 8,684,398 B1 * | 4/2014 | Nyitray | A61G 5/1051 |
| | | | 280/47.38 |
| 10,082,913 B2 | 9/2018 | Moller et al. | |
| 10,893,608 B2 | 1/2021 | Chou et al. | |
| 2002/0076948 A1 | 6/2002 | Farrell et al. | |
| 2002/0121146 A1 | 9/2002 | Manaresi et al. | |
| 2010/0206614 A1 | 8/2010 | Park et al. | |
| 2013/0075175 A1 * | 3/2013 | Vollmer | B62M 6/40 |
| | | | 180/206.1 |
| 2017/0187063 A1 * | 6/2017 | Pistorino | H01M 10/056 |
| 2017/0203811 A1 * | 7/2017 | Germanovsky | A61G 5/125 |
| 2017/0233902 A1 | 8/2017 | Grant et al. | |
| 2021/0100452 A1 | 4/2021 | Brister et al. | |
| 2022/0085410 A1 * | 3/2022 | Ahn | H01M 10/0525 |
| 2022/0255130 A1 * | 8/2022 | Frieberg | H01M 10/0565 |

* cited by examiner

102

104

106

108

110

202

206

204

208

210

212

402

404

406

700

720

704
702
704
706
704
702

704
706
704
702
704

706

720

710

800

820

806
802

804

802

804

806
802

804

810

1504

1502

1506

1508

1510

1602

1606

1604b

1604a

STRUCTURAL ENERGY STORAGE FOR CF BASED PERSONAL MOBILITY AND LIGHTWEIGHT DELIVERY

CROSS-REFERENCE TO RELATED APPLICATIONS

This patent application is related to non-provisional application Ser. No. 17/372,629 filed Jul. 12, 2021, now U.S. Pat. No. 11,769,879, dated Sep. 26, 2023, the entire contents of which are incorporated herein by reference.

This patent application is also related to non-provisional application Ser. No. 17/574,621, filed Jan. 13, 2022, entitled "STRUCTURAL ENERGY STORAGE WITH CARBON FIBER FOR SPORT EQUIPMENT SENSOR" which is filed concurrently herewith, the entire contents of which are incorporated herein by reference.

This patent application is also related to non-provisional application Ser. No. 17/574,660, filed Jan. 13, 2022, now U.S. Pat. No. 12,139,235, dated Nov. 12, 2024, entitled "STRUCTURAL ENERGY STORAGE FOR CF BASED POWERED MOBILE DEVICES" which is filed concurrently herewith, the entire contents of which are incorporated herein by reference.

This patent application is also related to non-provisional application Ser. No. 17/574,642, filed Jan. 13, 2022, now U.S. Pat. No. 12,139,235, dated Nov. 12, 2024, entitled "APPLICATION OF STRUCTURAL ENERGY STORAGE WITH CARBON FIBER IN PERSONAL WEARABLE AND CARRIABLE DEVICES" which is filed concurrently herewith, the entire contents of which are incorporated herein by reference.

FIELD OF THE DISCLOSURE

This disclosure is directed to structural energy storage devices, containing a plurality of lithium ion batteries having an anode of a continuous carbon fiber core, applied to mobility and lightweight delivery equipment having sensors in order to compensate for weight to power the sensors and alleviate problems associated with battery positioning and the effects of a battery on weight balance.

DISCUSSION OF THE BACKGROUND

Carbon fiber (CF) composite material is being widely adopted in frames for personal mobility, such as personal medical equipment, stroller, exoskeleton, tripod, camping gear, suitcase, cargo cases, and a reusable package, as well as in snowboard, skateboard, bowling ball etc. due to its attractive mechanical property. These example applications would benefit from lighter weight as they are movable or portable so that carbon fiber composite material becomes a viable solution. These applications may be categorized based on how carbon fiber composite materials are being used.

One category of application is a carbon fiber frame in mobility devices such as personal medical equipment, an exoskeleton and a stroller. FIGS. 1A to 1E illustrate conventional Rollator, Wheelchair, Clutches, Stroller and exoskeleton that incorporate carbon fiber composites in their frame. The carbon fiber in these products has only one function, structural support with reduced weight.

A second category of application is camping equipment and portable travel bags where lightweight is considered as the design priority for purposes of carrying and transporting. FIGS. 2A to 2F illustrate examples of compact Bivouac equipment, cooler, portable bed, suitcase, backpack and tripod. For example, Bivouac equipment and portable bed, where extremely limited encampment is preferred, weight reduction is a main factor in choosing equipment. Likewise, CF based travel equipment, for example a cooler, suitcase, backpack and tripod takes advantage of CF's light weight.

A third category of application is a delivery box, and especially its usage with a delivery drone. FIG. 3 illustrates a conventional example of CF enforced cardboard box and CF framed drone. The frame of the drone 302 presently adopts more carbon and CF enhanced cardboard boxes 304 are emerging in the delivery industry.

A fourth category is related to sports equipment which adopts CF. For example snowboard, ski, skateboard and bowling ball. In skateboard, ski and skateboard, sensors to measure player's performance are attempted to installed. FIGS. 4A, 4B, 4C illustrate conventional examples of sensor attached CF snowboard, CF finished bowling ball and CF skateboard.

These conventional approaches consider carbon fiber composite as a structure by which weight can be reduced. However, provided a power source, electric energy may be supplied in order to expand to additional functions in personal mobility and lightweight delivery. For example, added energy can be supplied to add functions such as powered movement of a wheel, operation of biosensors, emergency connection, GPS, emergency battery for personal devices etc.

SUMMARY OF THE DISCLOSURE

An aspect is a mobile apparatus can include a motion action portion. The motion action portion including a frame portion, at least part of the frame portion including a structural battery, the structural battery including one or more energy storage devices. Each of the one or more energy storage devices having at least one anode core of a continuous carbon fiber, an electrolyte arranged on the at least one continuous carbon fiber core, and a cathode layer arranged to the at least one continuous carbon fiber core on the electrolyte. At least one interface electrically connected to the structural battery, the interface for inputting power for charging the structural battery and for outputting power.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
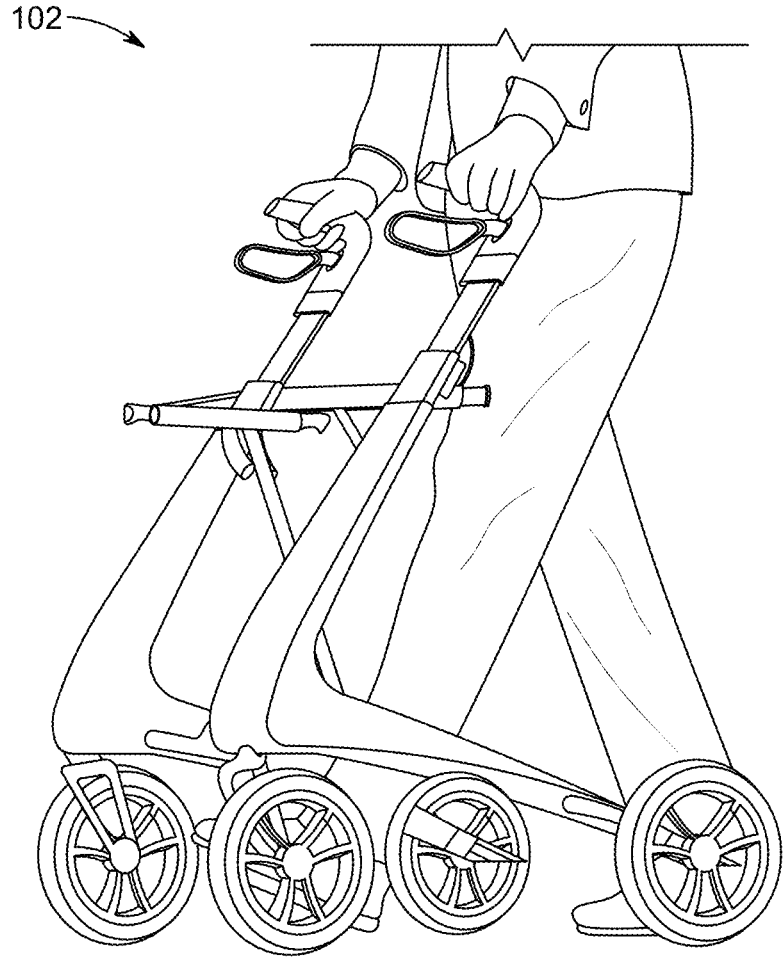
FIGS. 1A to 1E illustrate conventional carbon fiber based Rollator, Wheelchair, Clutches, Stroller and exoskeleton.
Figure 1B:
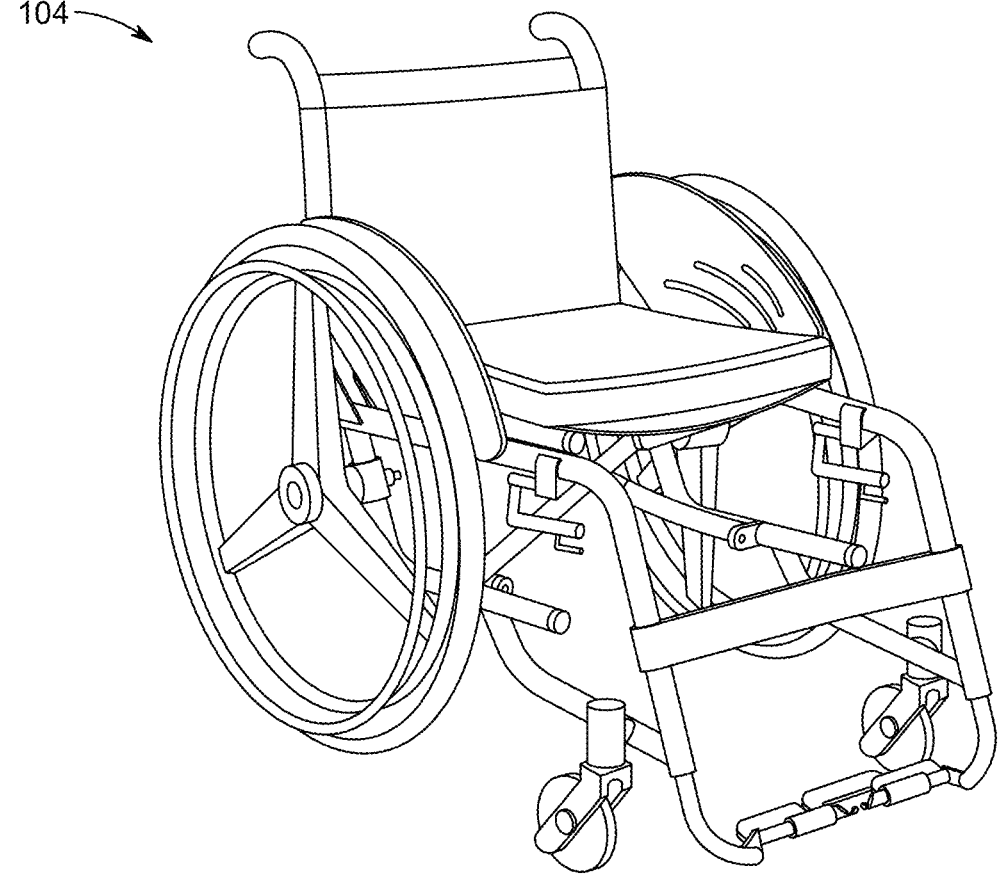
Figure 1C:
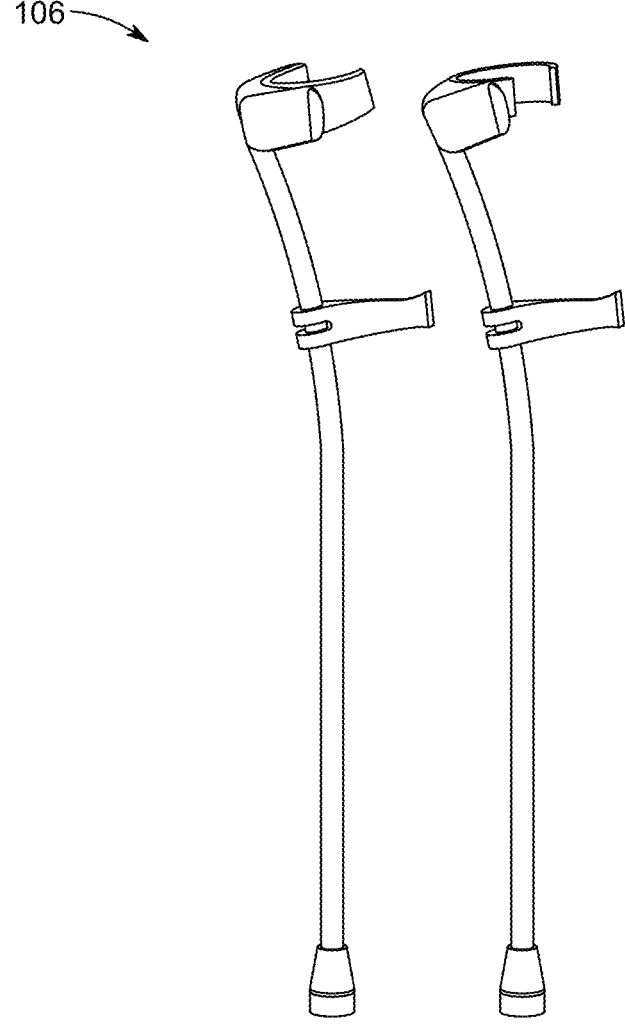
Figure 1D:
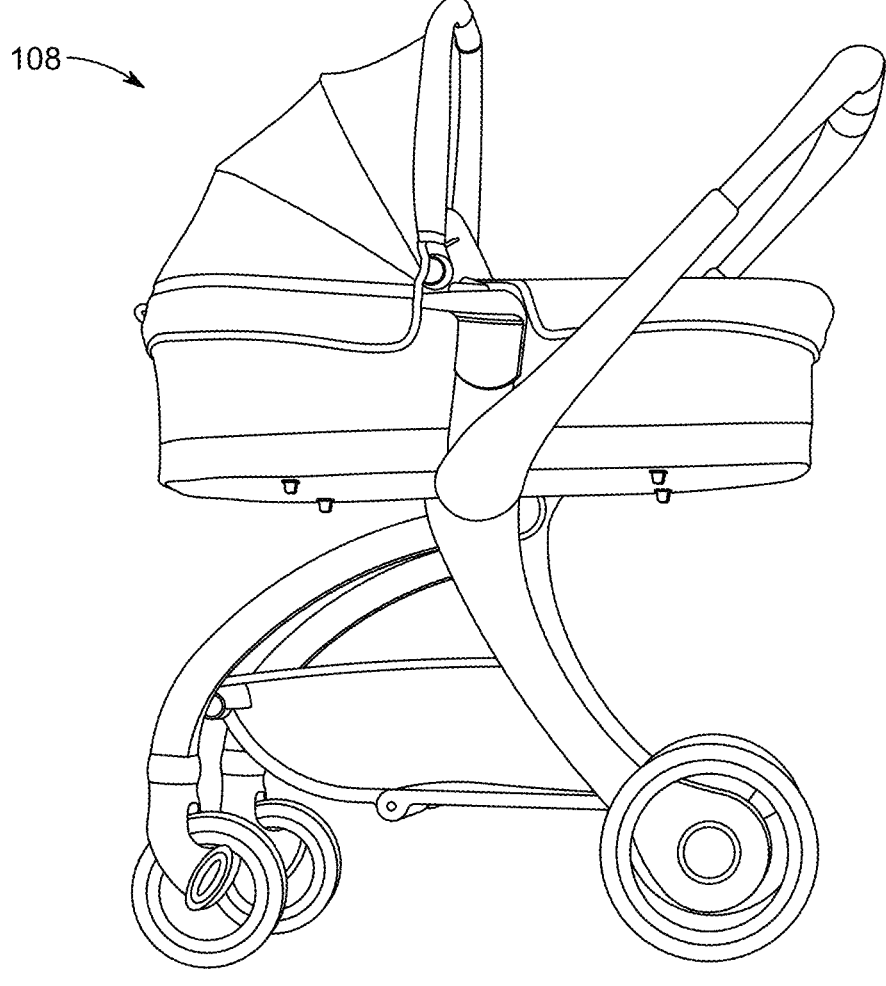

As used herein, the words "a" and "an" and the like carry the meaning of "one or more." The phrases "selected from the group consisting of," "chosen from," and the like include mixtures of the specified materials. Terms such as "contain (s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

Disclosed embodiments relate to a structural energy storage formed in CF to supply electricity which facilitates various added features, motors, or sensors either embedded in or attached on devices for personal mobility and lightweight delivery. The electricity can be used to operate embedded sensors, support actuation, heat or cool etc. The inventors recognized that a structural battery employing a carbon fiber core anode can bring about a power source without much increase in size and weight. In an ideal case, if the structural battery has the same energy density and stiffness as a conventional battery and structure respectively, the mass of an added feature, motor, sensor unit may be reduced by as much as 25-35%. However, even if the ideal is not achieved, significant weight savings would still be possible depending on the structural mass efficiency and structural energy efficiency attained with the device. Moreover, the structural battery employing a carbon fiber core anode may be extended to a wide range of utilities by providing energy storage in addition to structural form and support of carbon fiber composite materials.

The structural battery includes two main components:

1. A mechanically compliant electrolyte coated onto the carbon fiber that acts as a mechanical buffer layer between the carbon fiber and cathode while simultaneously conducting lithium ions.

2. A composite cathode designed to have a very low volume expansion by embedding active material particles in a conductive polymer matrix.

The mechanically compliant electrolyte may have low stiffness but provides good adhesion to the anode and cathode.

In some embodiments, a structural battery may include one or more coaxial energy storage devices. A coaxial energy storage device may be prepared by first coating a continuous carbon fiber with an electrolyte precursor coating solution containing a lithium salt, a polymer or monomer which solvates lithium ion, a gel or elastomer matrix polymer or oligomer, a UV sensitive cross-linking agent, a photoinitiator and a plasticizer. The polymer or monomer which solvates lithium ion and the gel or elastomer matrix polymer or oligomer may be the same material and correspond to the polymers used for the electrolyte or the precursors thereof.

The lithium salt provided in the gel or elastomer of the electrolyte coating comprises at least one selected from the group consisting of LiTFSI, $LiBF_4$, $LiPF_6$, $LiClO_4$, $LiCF_3SO_3$, LiCl and $LiAsF_6$. Combinations of these may be employed and other additives to enhance lithium ion conductivity may be included.

Conventionally known photoinitiators compatible with the polymer and/or oligomer are employed and may include but are not limited to any of aminoacetophenones, phosphine oxides, benzophenones, benzyl formates and thioxanthones. Such photoinitiators are commercially available.

The cross-linking agent employed is determined by the polymer of oligomer structure and is well known to one of skill in the art.

The electrolyte material composition is dissolved in a carbonate solvent or ether solvent system and my then be applied to the continuous carbon fiber by any suitable coating method which applies a uniform and complete coating to the entire carbon fiber surface. In one embodiment, in preparing the electrolyte coating composition it may be necessary to prepare a composition which forms a contact angle on the carbon fiber surface of 100° or less. The lower the contact angle the thinner the coating that can be applied to the carbon fiber. The contact angle may be controlled by selection of solvent, plasticizer, concentration of the lithium salt, polymer, and temperature. In one embodiment, the electrolyte may also be coated onto the carbon fibers using vacuum bagging or vacuum infusion technique. The electrolyte precursor solution can be infiltrated into the carbon fiber.

Figure 5:
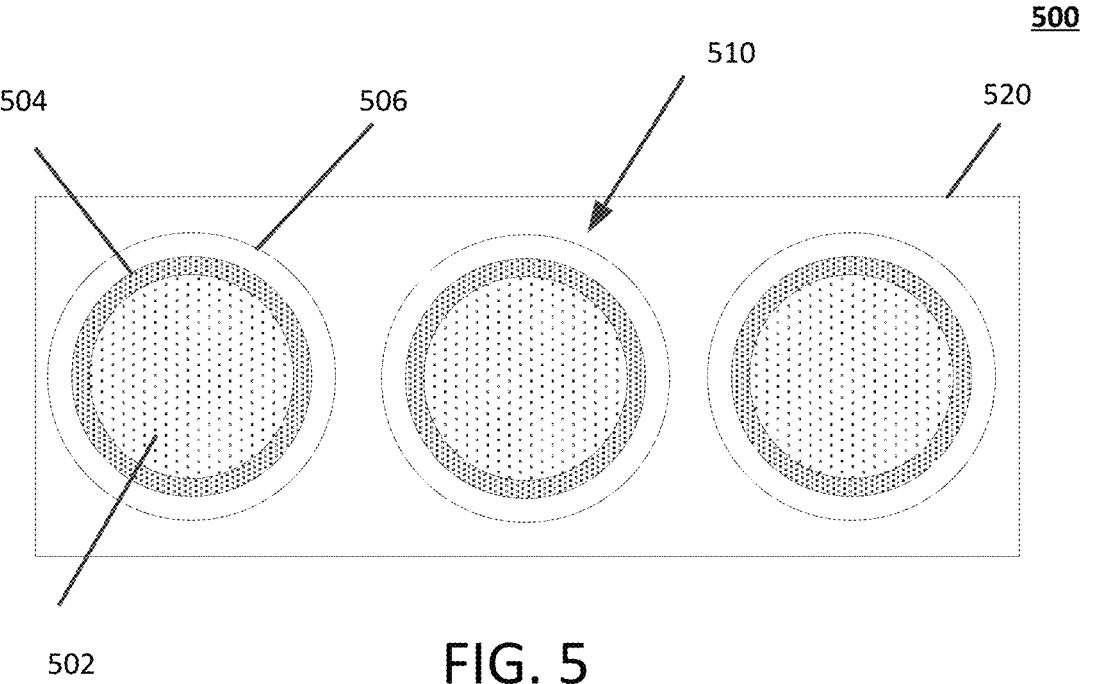
FIG. 5 shows a schematic drawing of a structural arrangement of coaxial energy storage devices in a shell according to an embodiment of the disclosure.

FIG. 5 shows a schematic drawing of a structural arrangement of coaxial energy storage devices in a shell according to an embodiment of the disclosure. Once the electrolyte coating 504 is applied to the continuous carbon fiber 502, it is exposed to UV irradiation to cure the polymer matrix coaxially arranged about the carbon fiber which is now the core of the device. The solvent remains in order to obtain the elastic electrolyte coating layer.

Next the cathode coating 506 is applied to the surface of the elastic electrolyte coating 504.

A plurality of the coaxial energy storage device 510 is arranged within a shaped composite battery structure 500 having a shell 520 or outer coating and an inner matrix enclosed by the shell. The matrix encloses the plurality of coaxial energy storage devices 510.

Figure 6:
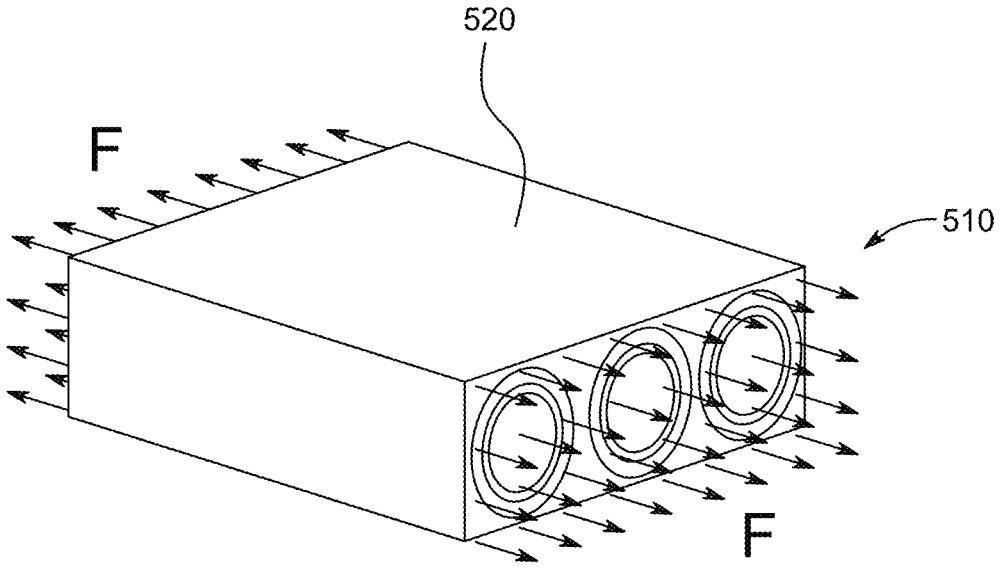
FIG. 6 shows another schematic drawing of a structural arrangement of coaxial energy storage devices in a shell according to an embodiment of the disclosure.

Once the electrolyte and cathode layers are coated onto the carbon fibers, the coaxial energy storage devices 510 are arranged within a shell 520 having a structure and are subsequently impregnated with a matrix material as schematically represented in FIG. 6. The composite battery structure 500 (referred to herein as a coaxial arranged carbon fiber battery, or simply coaxially arranged battery) schematically represented in FIG. 6 with embedded energy storage can be formed to perform in a wide variety of structural applications while provided electrical power to devices requiring energy or supplementing the energy requirement of the device.

The shell 520 may be composed of a metal and/or a fiber reinforced plastic. Materials employed for such sandwich shell matrix composites are conventionally known for example in the construction of airplane components, automobile components, protective equipment and other vehicles for transportation and sport. In particular, the matrix enclosed by the shell 520 may comprise a resin selected from the group consisting of (meth) acrylate resins, epoxy resins, diallyl phthalate resins and phenolic resins.

The coaxial energy storage devices 510 may be arranged within the composite structure (coaxially arranged battery 500) in any arrangement. For example, unidirectionally and in parallel, in a mat arrangement wherein the coaxial energy storage device are oriented both in weft and warp orientations or in only one of weft and warp while the other direction is occupied by a structural fiber such as a glass fiber, a carbon fiber or an aramid fiber.

Figure 7:
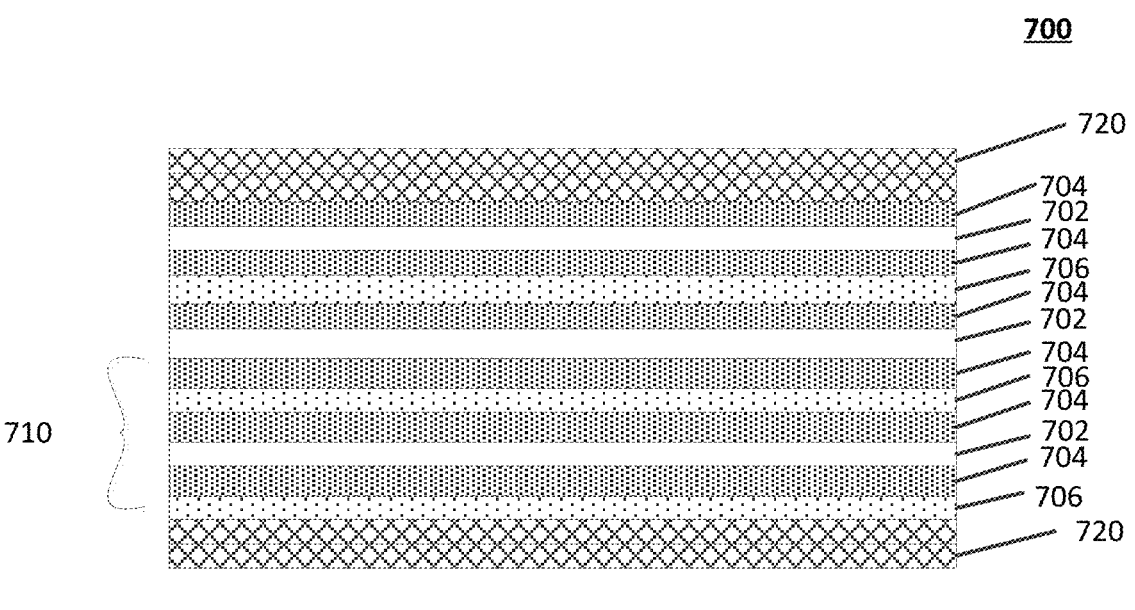
FIG. 7 shows a schematic drawing of a structural arrangement 700 of laminate energy storage devices between shell layers.

In some embodiments, a structural battery may include structural laminate energy storage devices. FIG. 7 shows a schematic drawing of a structural arrangement 700 of laminate energy storage devices between shell layers. An electrolyte layer 704 is applied to a continuous carbon layer 702 and is exposed to UV irradiation to cure the polymer matrix arranged on the carbon layer. The solvent remains in order to obtain the elastic electrolyte coating layer.

Next a cathode layer 706 is applied to a surface of the electrolyte layer 704 to forma a laminate energy storage device 710.

A plurality of the laminate storage device 710 is arranged within a shaped composite structure having a shell layer 720 or outer coating and an inner matrix enclosed by the shell. The matrix encloses the plurality of laminate energy storage devices 710.

Figure 8:
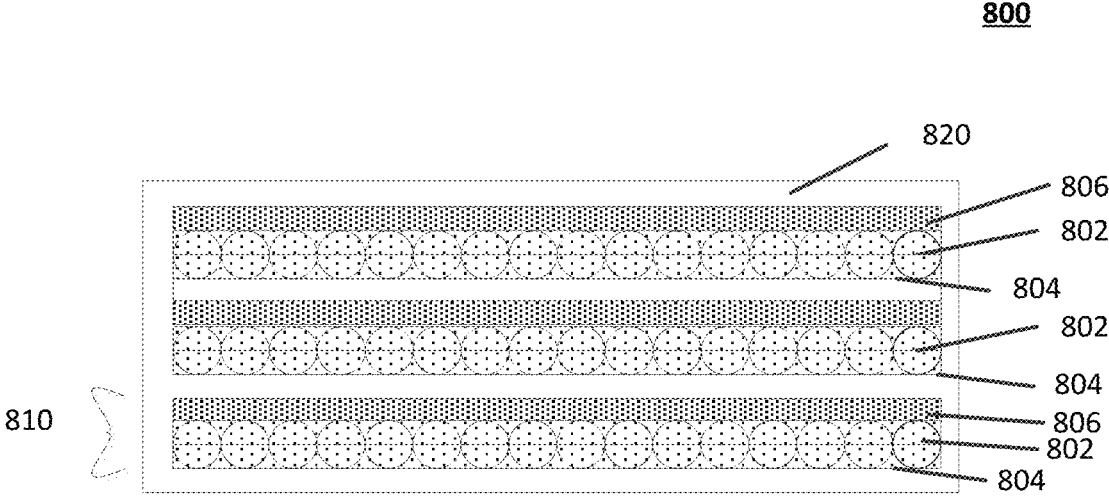
FIG. 8 shows a schematic drawing of a structural arrangement of laminate energy storage devices with carbon fibers.

In some embodiments, a structural battery may include structural laminate energy storage devices in which the carbon layer is a plurality of carbon fibers 802. FIG. 8 shows a schematic drawing of a structural arrangement of laminate energy storage devices with carbon fibers. An electrolyte layer 804 is applied to a continuous layer of carbon fibers 802. Once an electrolyte coating 804 is applied to the continuous carbon fibers 802, it is exposed to UV irradiation to cure the polymer matrix coaxially arranged about the carbon fiber which is now the core of the device. The solvent remains in order to obtain the elastic electrolyte coating layer. A cathode layer 806 is applied to a surface of the layer of the electrolyte coating 804 to form a laminate energy storage device 810. A plurality of the laminate storage device 810 is arranged within a shaped composite structure having a shell layer 820 or outer coating and an inner matrix enclosed by the shell. The matrix encloses the plurality of laminate energy storage devices 810.

Figures 9A, 9B:
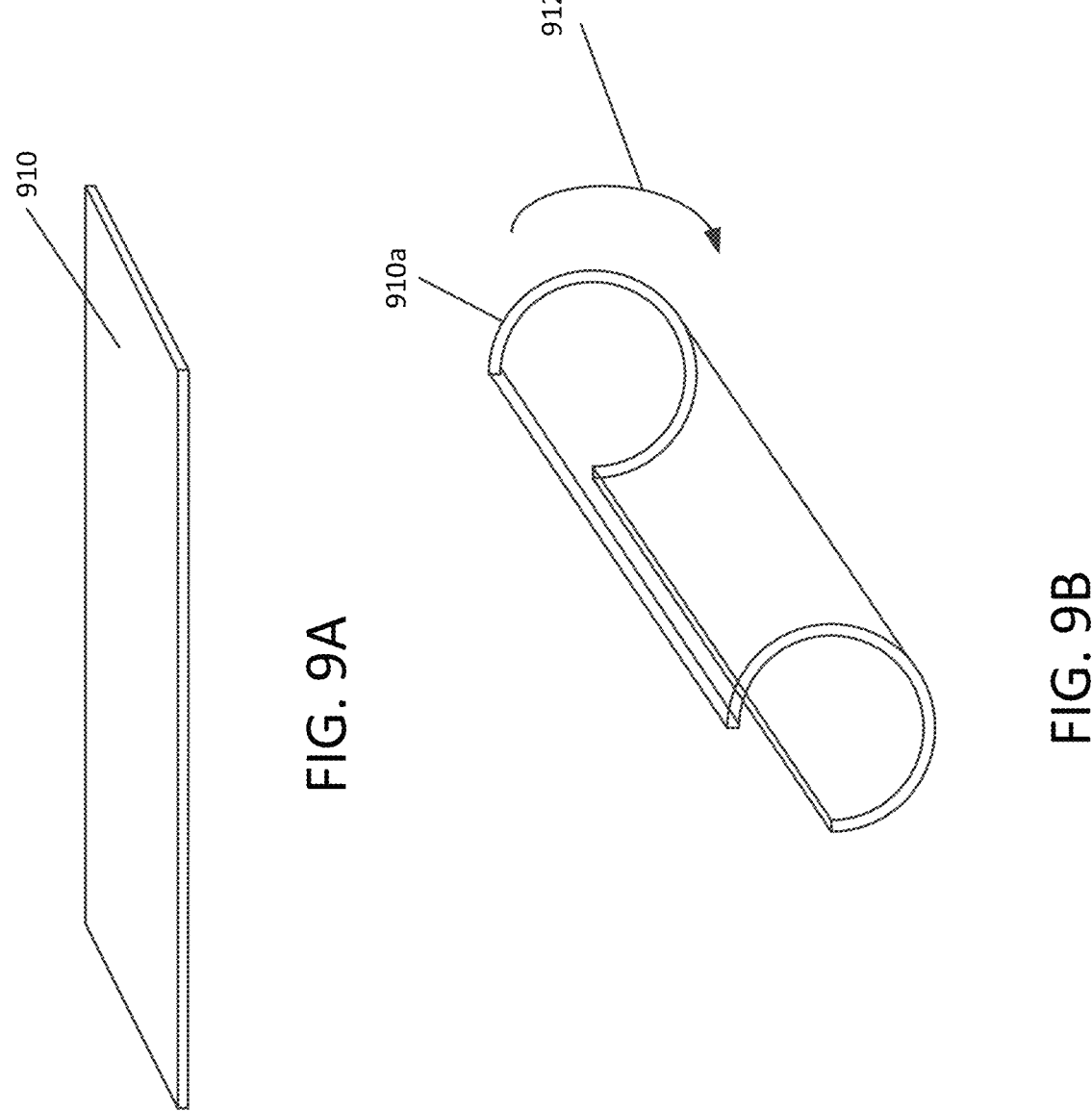
FIGS. 9A, 9B illustrate steps in forming a carbon fiber mat into a shape.

In manufacturing, the Carbon Fiber composite battery structure can be made into a mat arrangement, shaped into a desired shape, and cured. FIGS. 9A, 9B illustrate steps in forming a carbon fiber mat into a shape.

FIG. 9A shows where the carbon fiber composite structure is in a mat arrangement 910. FIG. 9B shows where the mat is formed 912 into a shape 910a. When the desired shape is obtained, the final shape 910a is cured. Although the shape shown in FIG. 9B is curved, the mat 910 in FIG. 9A may be folded at one or more creases to form various shapes, such as rectangular-like cross-section shapes, oval-like cross-section shapes, to name a few.

Figures 10A, 10B:
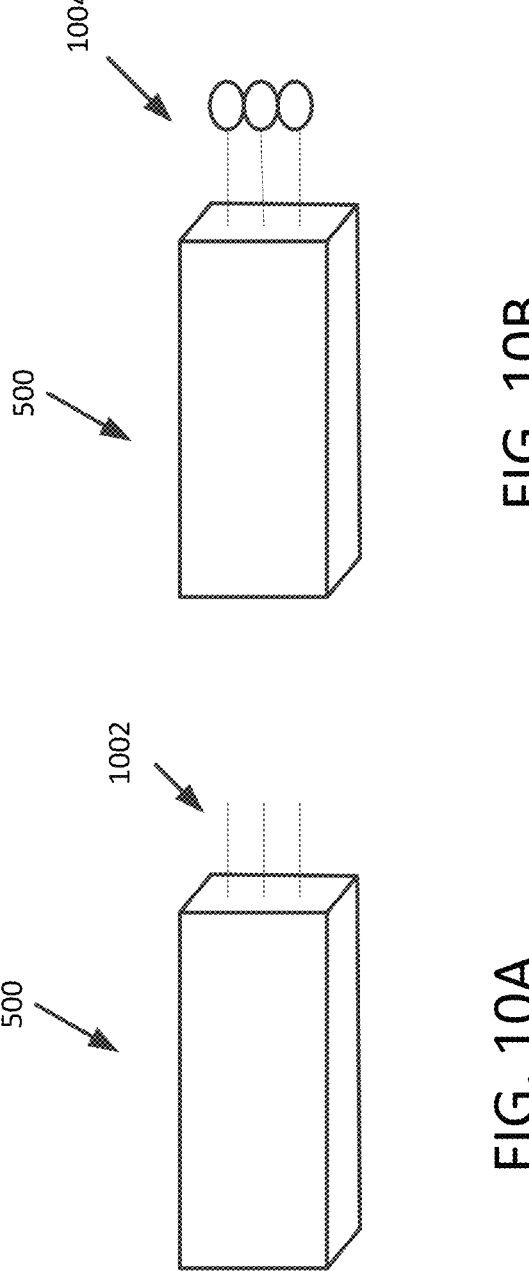
FIGS. 10A, 10B are a schematic of a connection structure for a coaxially arranged battery.

FIGS. 10A, 10B are a schematic of a connection structure for a structural battery. Connection to the structural battery 500 (or 700, 800) may be by a wired connection 1002 or a wireless connection 1004. In the case of a wired connection 1002, the structural battery 500 (or 700, 800) may include wire terminals extending from an end of the composite structure. In the case of a wireless connection 1004, the structural battery 500 may include one or more coils at an end of the composite structure 500. In addition, the structural battery may be configured with a charge unit that may be connected by the wired connection 1002 or the wireless connection 1004.

Although it may be possible to use a conventional battery, such as a coin-shaped battery, the conventional battery may become out of position due to impact from action of a device. The conventional battery may become dislodged, leading to failure of any sensors and other electronics to operate.

Disclosed embodiments add one more features of built-in energy storage from a carbon fiber composite material itself and support electricity to operate embedded sensors, support actuation, heat or cool etc. In a first category of application, a carbon fiber frame is incorporated in mobile devices such as personal medical equipment, exoskeleton and stroller. A built-in energy storage from a carbon fiber composite material itself can support the addition of more features like bio-sensing, emergency call, motion support for uphill, and extra power for personal devices. In addition, a built-in energy storage from a carbon fiber composite material can be provided as an emergency power source.

Figures 11, 12:
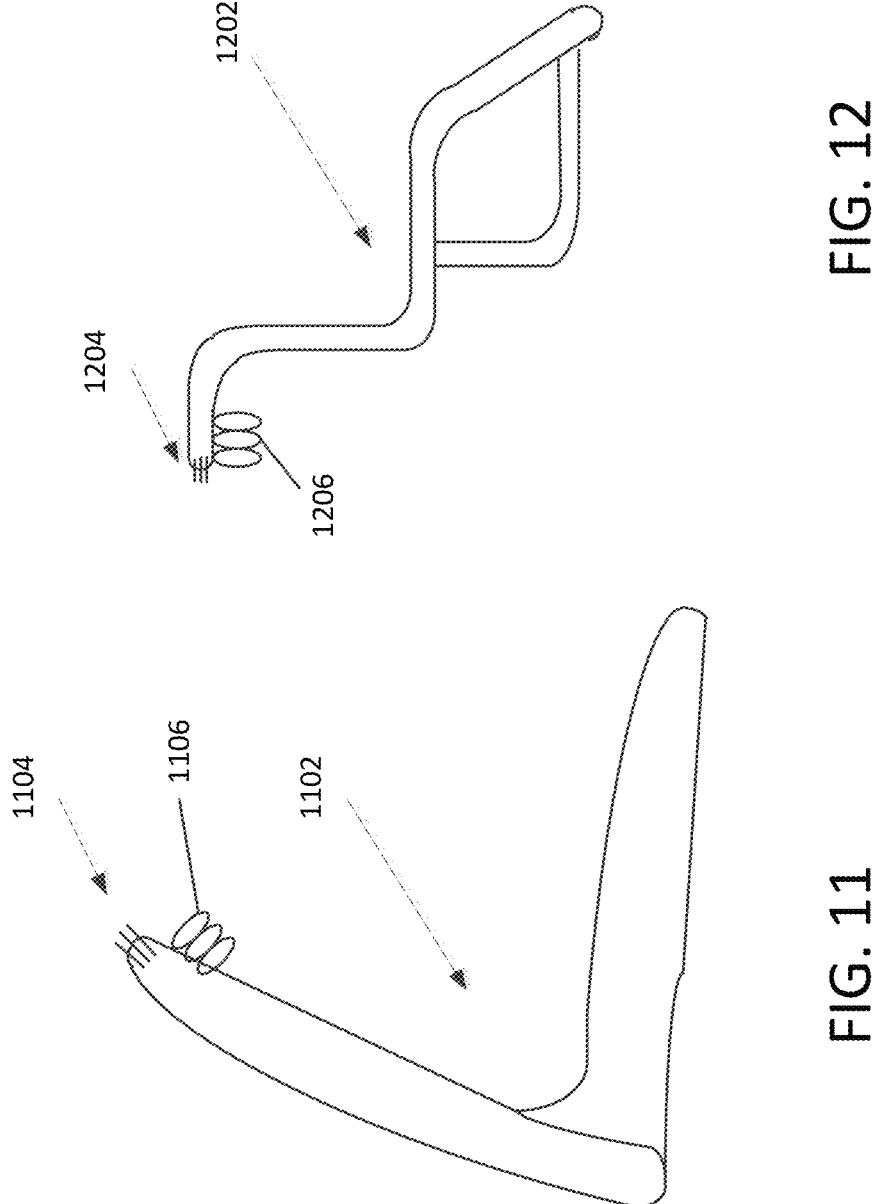
FIG. 11 is a schematic of a coaxial arranged CF battery configured as the frame of a rollator according to an embodiment of the disclosure.
FIG. 12. is a schematic of a structural CF battery configured as the frame of wheelchair according to an embodiment of the disclosure.

FIG. 11 is a schematic of a structural CF battery configured as the frame of a rollator according to an embodiment of the disclosure. In an embodiment, a portion of or the entire carbon fiber frame of the rollator 102 may be configured as a structural CF battery 1102. A terminal at one end of the structural CF battery 1102 of the rollator frame may provide a wired interface 1104 for connection to sensors, and/or a wireless interface 1106 for wireless connection to an external device. Provided the structural CF battery 902, the modified carbon fiber rollator 102 can be configured to include one or more bio-sensing sensors incorporated into one or both of the handles. Bio-sensing sensors can include a heart rate monitor device and simply a touch sensor. The touch sensor may be used to detect when the rollator 102 is being held. The touch sensor may be a proximity sensor such as a proximity sensor found in smartphones. A rollator 102 may be equipped with additional devices such as an emergency call device and/or an accelerometer. The accelerometer may be activated to detect that the rollator 102 has rapidly fallen over while its handles are being held, indicating a possible operator fall. An emergency call device may also be one that detects a fall, but ads a speaker and microphone to allow the capability of making an emergency call. In some embodiments, the structural CF battery may be connected to a power jack, such as a USB port, so that a device such as a portable emergency call device may receive power from the coaxially arranged battery. The rollator 102 may be equipped with a GPS unit so that the location of the rollator may be detectable. In some embodiments, the structural CF battery may serve as an auxiliary battery for personal devices.

FIG. 12 is a schematic of a structural CF battery configured as the frame of wheelchair according to an embodiment of the disclosure. A portion of or the entire carbon fiber frame of the wheelchair 104 may be configured as a structural CF battery 1202. A terminal at one end of the structural CF battery 1202 adjacent to a handle of the wheelchair 104 may provide a wired interface 1204 for connection to sensors, and/or a wireless interface 1206 for wireless connection to an external device. Some wheelchairs are operated by a motor and include electronics for moving the wheelchair. A wheelchair 104 without a motor may be configured with one or more bio-sensors incorporated into an armrest or other handle. The wheelchair 104 may be equipped with an emergency call device or an interface connection to the structural CF battery for powering a portable emergency call device. Also, a wheelchair 104 that includes a motor for motion of the wheels may obtain electrical power for the motor from a structural CF battery. The coaxial arranged battery may provide some or all of the power for the motor, or may facilitate an increase in power for the motor. The wheelchair 104 may be equipped with a GPS unit so that the location of the wheelchair 104 may be detectable. In some embodiments, the structural CF battery may serve as an emergency battery for personal devices.

Figure 13:
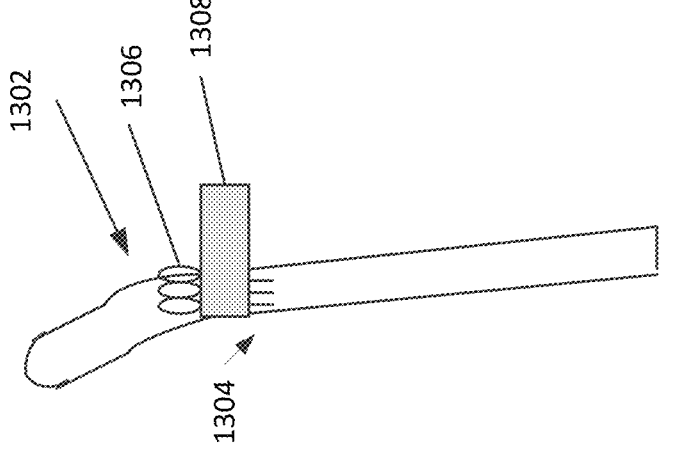
FIG. 13. is a schematic of a structural CF battery configured as a clutch according to an embodiment of the disclosure.

FIG. 13 is a schematic of a structural CF battery configured as a clutch walker according to an embodiment of the disclosure. A portion of or the entire carbon fiber frame of one or each of the clutches 106 may be configured as a structural CF battery 1302. A terminal at one end of the structural CF battery 1302 adjacent to a handle 1308 of the clutch 106 may provide a wired interface 1304 for connection to sensors, and/or a wireless interface 1306 for wireless connection to an external device. The one or more carbon fiber clutches 106 may be configured with one or more bio-sensors incorporated into an arm cuff and/or handle. The clutches 106 may be equipped with an emergency call device or may include an interface connection for powering a portable emergency call device. The clutch may be equipped with an accelerometer, which may send a signal indicating an abrupt motion, such as a fall. In some embodiments, the structural CF battery may serve as an emergency battery for personal devices.

Figure 14:
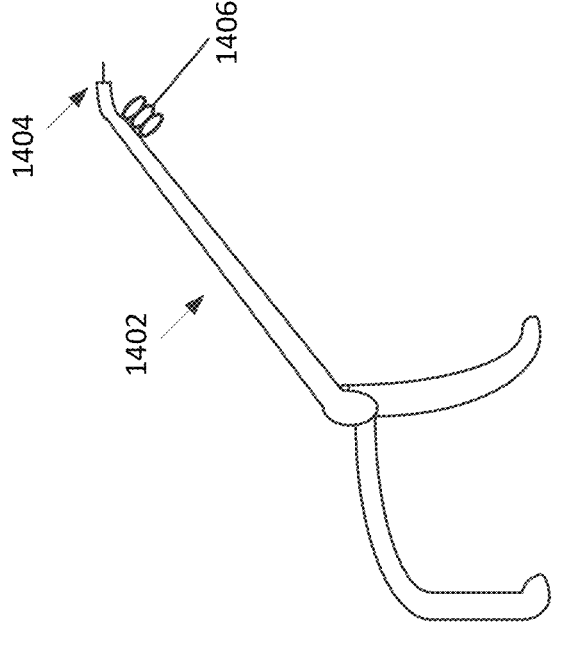
FIG. 14. is a schematic of a structural CF battery configured as the frame of a stroller according to an embodiment of the disclosure.

FIG. 14, is a schematic of a structural CF battery configured as the frame of a stroller according to an embodiment of the disclosure. A portion of or the entire carbon fiber frame of the stroller 108 may be configured as a structural CF battery 1402. A terminal at one end of the structural CF battery 1402 of the stroller frame may provide a wired interface 1404 for connection to sensors, and/or a wireless interface 1406 for wireless connection to an external device.

The modified carbon fiber stroller 108 may include one or more bio-sensing sensors incorporated into one or both of the handles. Bio-sensing sensors can include a heart rate monitor device and/or simply a touch sensor. The touch sensor may be used to detect when the stroller 108 is being held. A stroller 108 may be further equipped with an emergency call device. The stroller 108 may be equipped with a GPS unit so that the location of the stroller may be monitored. In some embodiments, the structural CF battery may serve as an emergency battery for personal devices.

Figure 15:
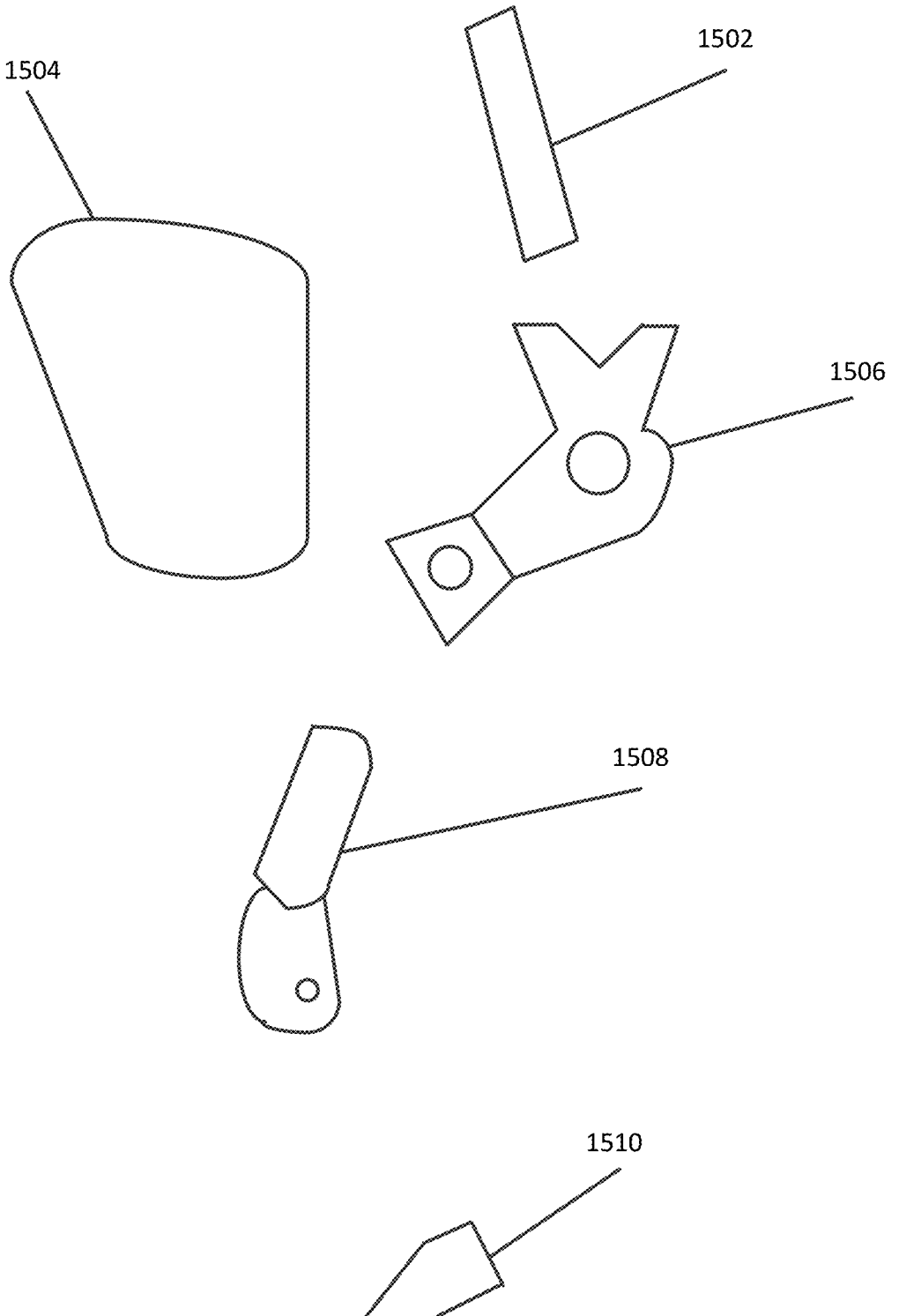
FIG. 15. is a schematic of a structural CF battery formed as parts of an exoskeleton according to an embodiment of the disclosure.

FIG. 15 is a schematic of a structural CF battery formed as parts of an exoskeleton according to an embodiment of the disclosure.

Figure 1E:
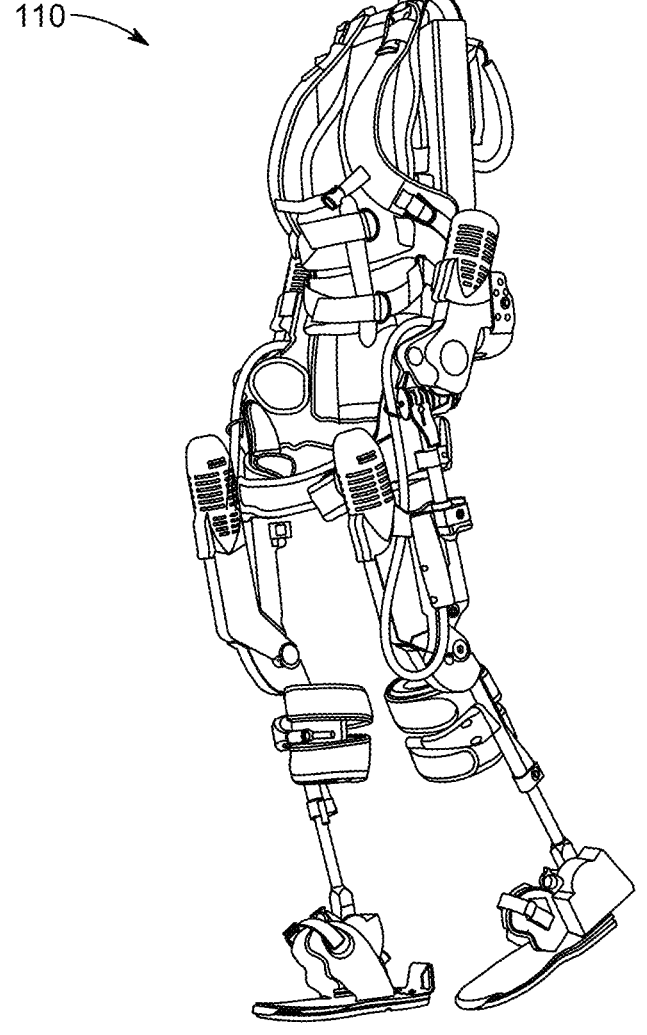
Figure 2A:
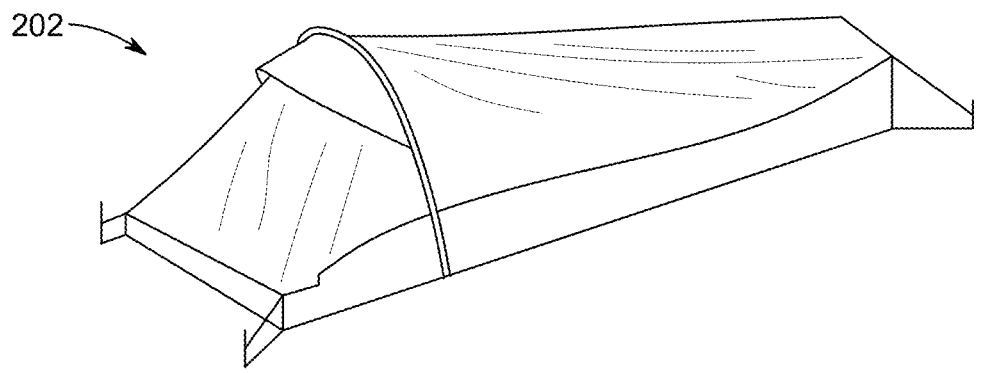
FIGS. 2A to 2F illustrate conventional examples of compact camping/Bivouac equipment, cooler, travel carriers such as a suitcase and a backpack, and a tripod.
Figure 2B:
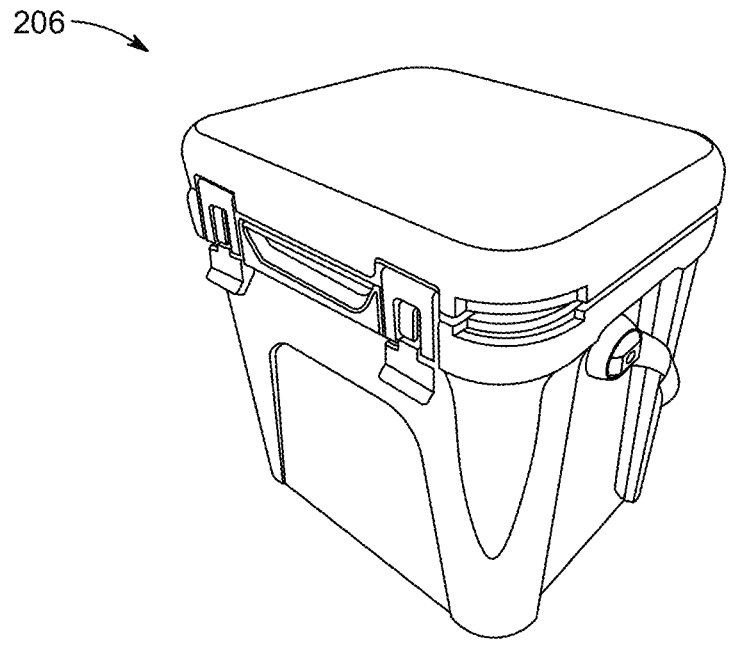
Figure 2C:
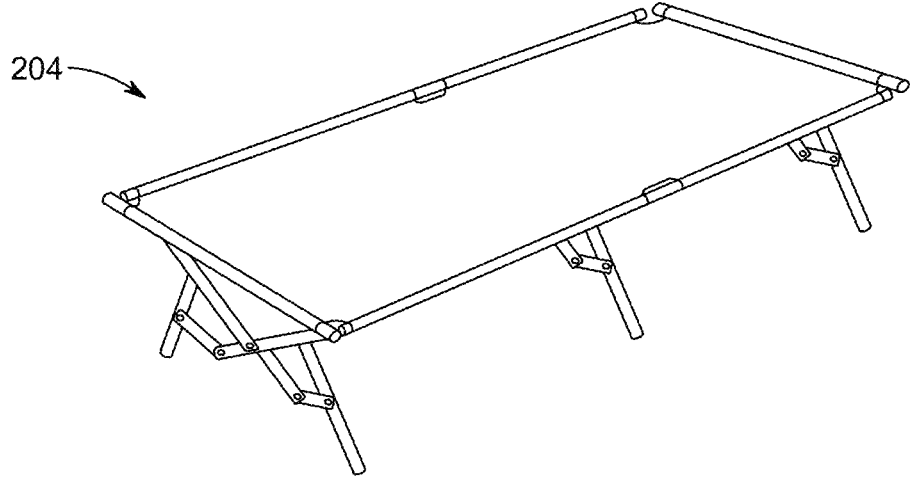
Figure 2D:
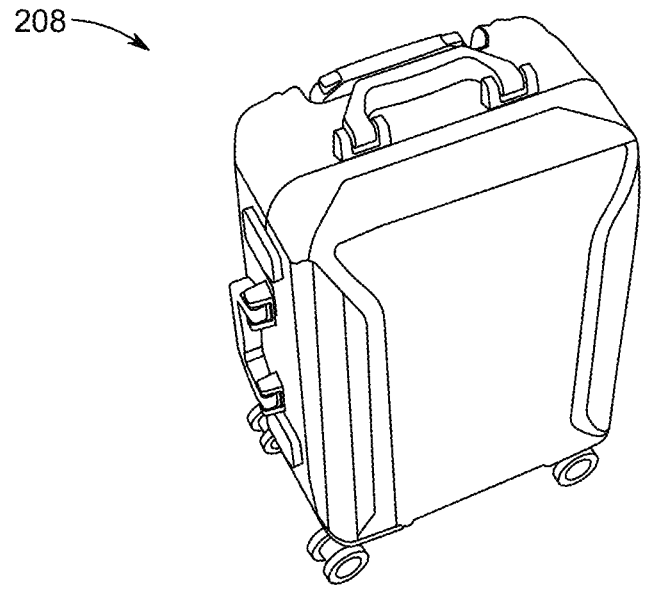
Figure 2E:
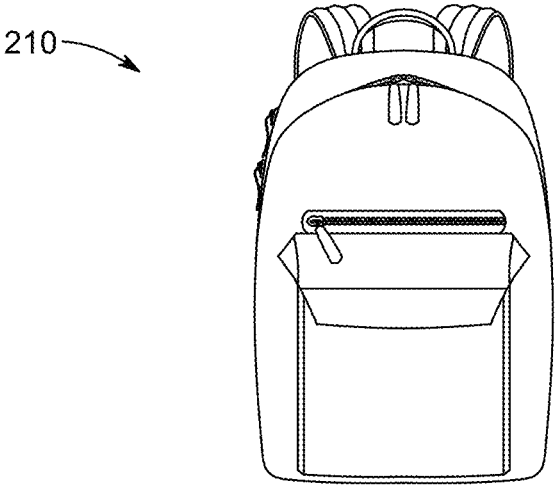
Figure 2F:
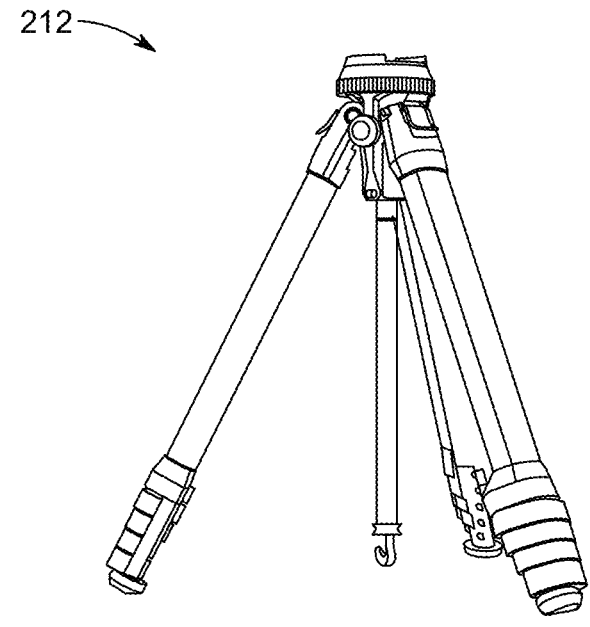
Figure 3:
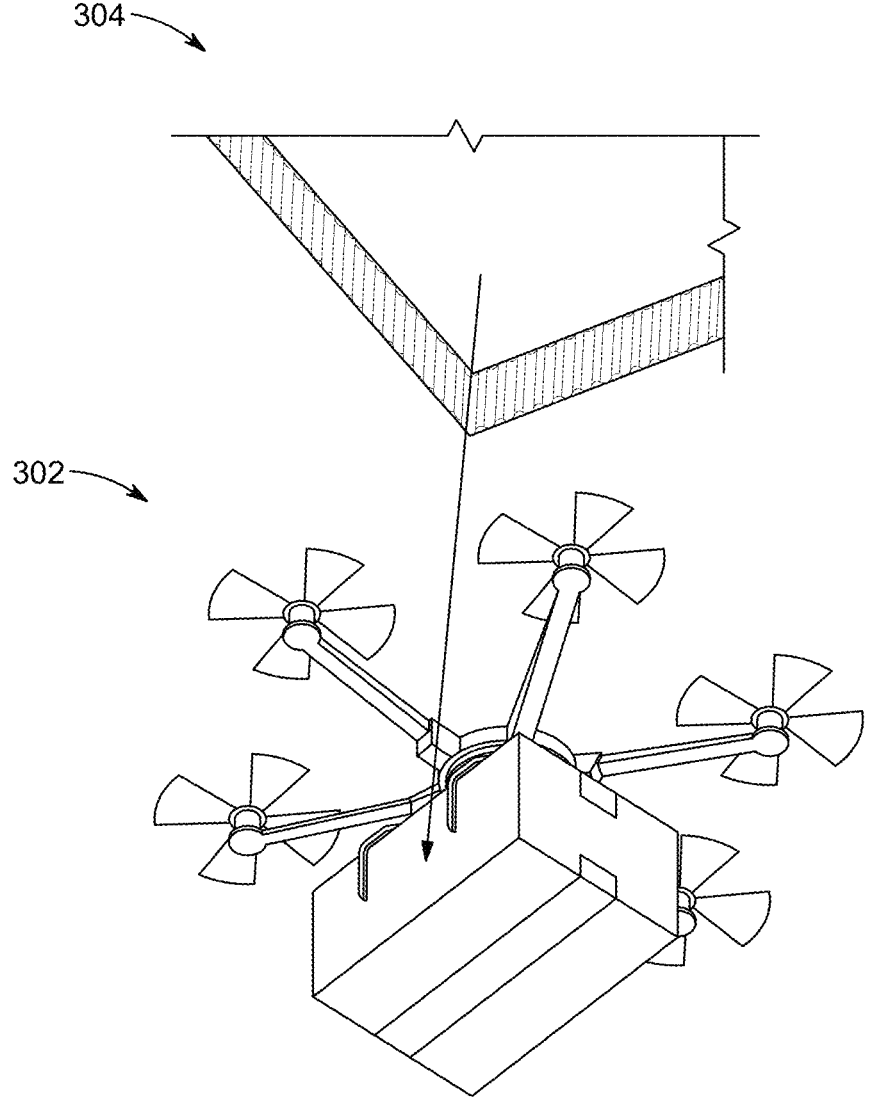
FIG. 3 illustrates a conventional example of CF enforced cardboard box and CF framed drone.
Figure 4A:
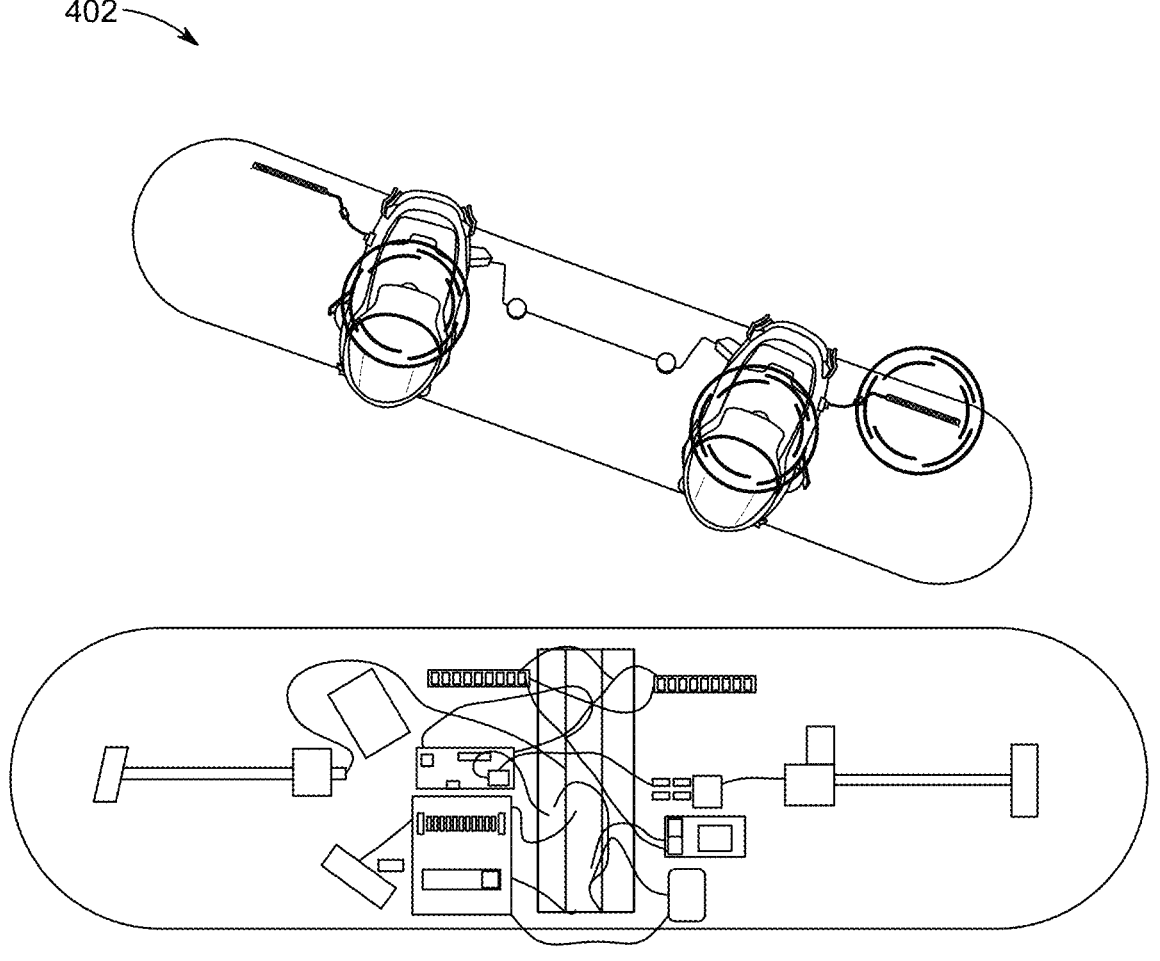
FIGS. 4A, 4B, 4C illustrate conventional examples of sensor attached CF snowboard, CF finished bowling ball and CF skateboard.
Figure 4B:
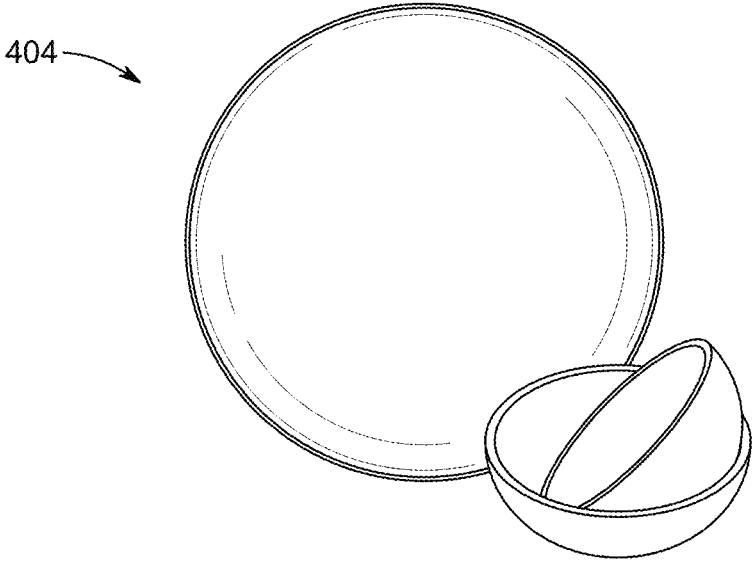
Figure 4C:
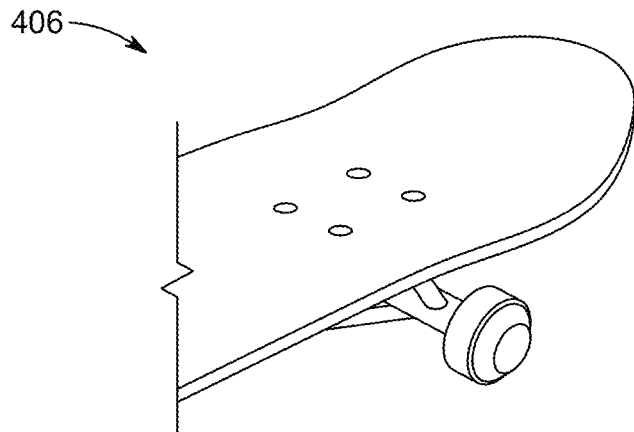

Some parts 1502- to 1510 of the exoskeleton that are made of carbon fiber composite material may be configured as structural CF batteries. A robot such as a walking robot shown in FIG. 1E may be configured with a variety of devices and sensors, including accelerometers, gyroscopes, force sensors, touch sensors, motors, computer processing devices, and communications devices. Typically, a battery is used to power these devices and sensors. Battery placement and weight is a significant issue when considering weight balance and robot stability. The power from the structural CF batteries may be used to provide at least some of the total power required for the various devices and sensors. Replacement of all or part of the battery by the structural CF battery can simplify control over weight balance and stability. Also, a structural CF battery located on a particular part may be used to provide power for devices located on or near the same particular part. In some embodiments, where weight balance has been previously optimized, some or all of the structural CF batteries may be used to provide backup power, or an auxiliary power source for additional electronic devices.

More and more, during camping and traveling, there has become an increased need and demand for electronic storage in the form of batteries, in order to power and/or recharge electronic devices. For example, while camping in a remote area or traveling, there can be a need to recharge cell phones, watches, cameras, GPS devices, and other small electric devices. Some electric devices such as GPS devices and watches may include a long lasting battery. However, smart watches and GPS devices with navigation screens may depend on daily recharging.

Camping products such as tent frames, frames for portable beds/chairs, and coolers are being made using carbon fiber composite materials to save weight without compromising strength. Travel products such as suitcases, carrying cases, backpacks include carbon fiber composite materials for similar reasons. Even products that are often carried to desired locations and serve as an object bearing member, such as tripods, include carbon fiber composite materials for weight reduction.

These camping and travel related products can be made using part of or all of the carbon fiber composite material formed as a structural CF battery. The carbon fiber frame of a tent 202, for example, can be used for energy storage. A magnetic electric charger interface, such as that provided for smartphones or smartwatches, may be connected to the terminals of the structural CF battery in the tent frame and used as a recharging station for electric devices. In a similar manner, the carbon frame of a portable bed or chair 204 can be used for energy storage, and can include a magnetic charger interface. A carbon fiber composite cooler 206 may be configured using the structural CF battery with an interface for charging electronic devices.

Backpacks, as well as luggage carriers such as suitcases and travel bags, are being equipped with USB ports. A cable for the USB port is plugged into a power bank housed on the inside of the backpack, or other luggage carrier, and the outside contains the USB port. The power bank is itself a power storage device that requires recharging.

Figure 16:
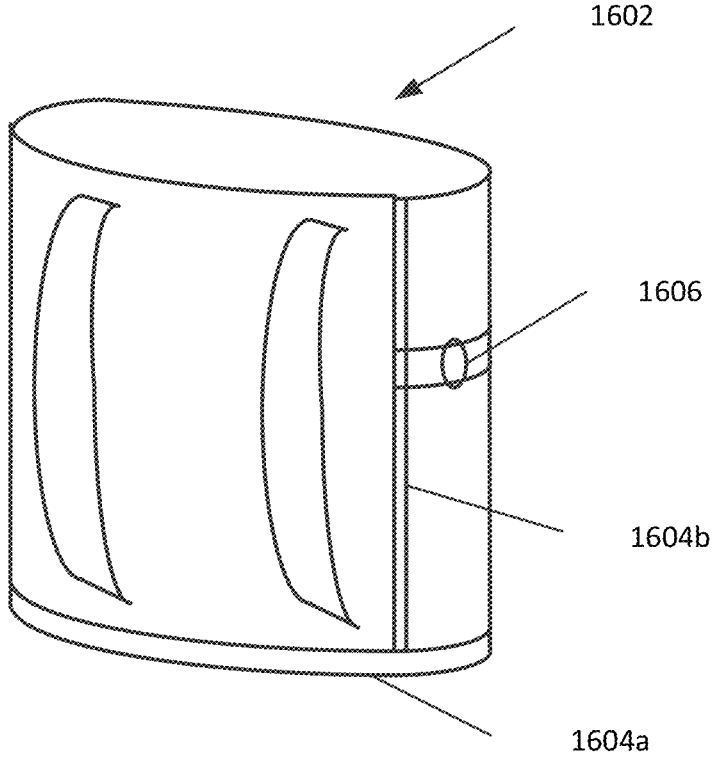
FIG. 16 illustrates a structural CF battery configured in the frame of a backpack according to an embodiment of the disclosure.

FIG. 16 illustrates a structural CF battery configured in the frame of a backpack according to an embodiment of the disclosure. By reconfiguring the backpack 210 or other luggage carrier 208 using a structural CF battery for some or all of the carbon fiber composite material of the backpack or other luggage carrier, the backpack 210 or other luggage carrier 208 can serve as the power bank (portable charger). The exemplary backpack 1602 can be configured with a structural CF battery in a frame portion 1604a for the bottom of the backpack 1602. Other portions of a frame, such as the back portion 1604b may be configured as a structural CF battery. At least one USB port 1606 can be connected to terminals of the structural CF battery.

Figure 17:
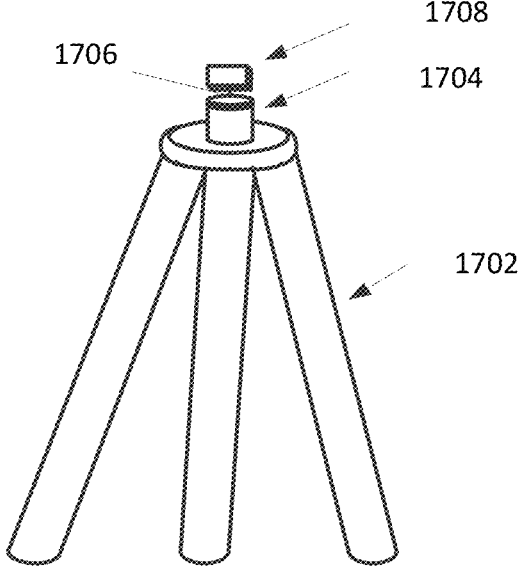
FIG. 17 illustrates a structural CF battery configured in the frame of a backpack according to an embodiment of the disclosure.

A carbon fiber tripod 212 can be configured so that part or all of the carbon fiber composite is formed as a structural CF battery. FIG. 17 illustrates a structural CF battery configured in the frame of a backpack according to an embodiment of the disclosure. All or a portion of the tripod legs 1702 can be configured as a structural CF battery. In some embodiments, an electric port, or USB port 1706 may be connected to terminals of the structural CF battery. The electric port or USB port 1706 may be located at or near the mounting platform 1704 at the top of the tripod 212 so that devices, such as a camera 1708, may be connected to the port to provide electric power, either for operation of the electric device, or for recharging an electric device. In addition, some tripods are equipped with a motor to rotate the mounting platform of the tripod 212. The motor may be powered by the structural CF battery. Also, remote control sensors for sending control signals to the motor may be powered by the structural CF battery.

Drones 302 for commercial delivery are required to be made of strong durable materials, but as light a weight as possible. The frame of some drones is made of carbon fiber composite, to provide the required strength and low weight. Cardboard boxes are emerging as the standard delivery container 304. More and more, cardboard boxes are being enhanced with carbon fiber composite materials for increased strength without significantly impacting weight.

Figure 18:
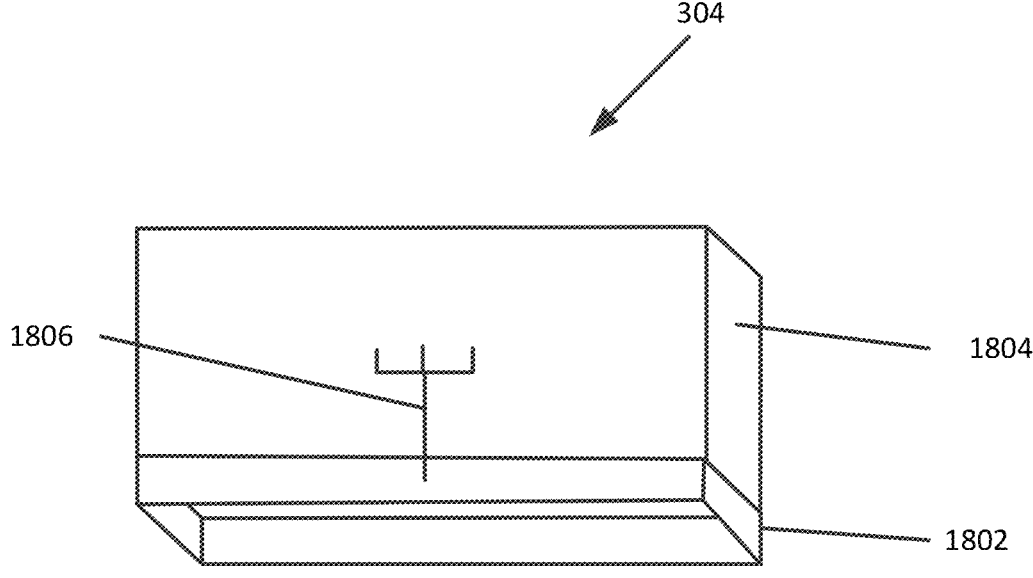
FIG. 18 illustrates a structural CF battery configured in the frame of a delivery container according to an embodiment of the disclosure.

FIG. 18 illustrates a structural CF battery configured in the frame of a delivery container according to an embodiment of the disclosure. The CF frame of a drone can be configured as a structural CF battery. The cardboard box container 304 can include a structural CF battery as the enhancement. In an embodiment, a bottom structure 1602 of the cardboard box container 304 may be configured as a structural CF battery. In addition, other portions of the cardboard box, such as one or more sides 1804 may be configured as a structural CF battery. The structural CF battery 1802 may include at least one wired connection interface 1806. The structural CF battery of the drone frame can be used as a power source for the drone 302. The structural CF battery of the delivery box 304 can be used as an axially power source to extend the range of the drone 302.

Figure 19:
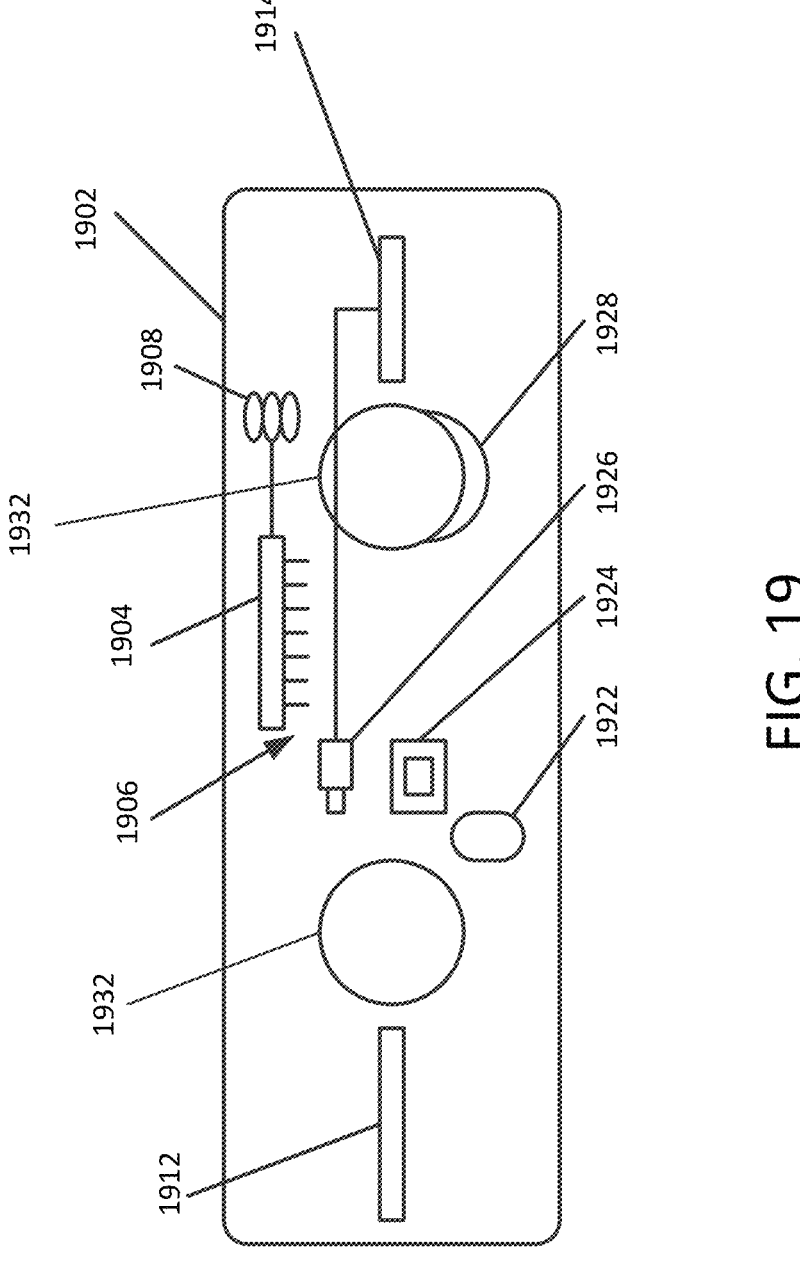
FIG. 19. is a schematic of a structural CF battery configured as a snowboard according to an embodiment of the disclosure.

FIG. 19 is a schematic of a structural CF battery configured in a shaped board such as a snowboard or skateboard, or a pair of skis. The term shaped board as used herein relates to a board having curved and/or rounded edges. Sensors for measuring player performance using shaped boards can easily be placed embedded within the structure of the shaped board, due to their compact size. Sensors such as accelerometer and GPS device typically are provided in small packages, and weigh a fraction of a gram. Also, bend sensors and gyroscopes can provide useful data for use of the board-based sport equipment, such as snowboards 402, skis, and skateboards 406. However, a major factor in using sensors on such shaped boards is the size of the battery and battery housing. A battery and battery housing cannot be mounted on these types of boards without impacting weight and weight balance, and without adding a protruding component to a sleek board design.

In order to eliminate the need for a separate battery and battery housing, board-based sport equipment such as snowboards 402, skis, and skateboards 406 can be formed using structural CF battery in place of some or all of carbon fiber composite material of the board. The structural CF battery can be used as the power source for embedded sensors, including an accelerometer, gyroscope, GPS device, one or more bend sensors (piezoelectric devices), to name a few. The accelerometer detects acceleration in the x-, y-, and z-axis directions, while the gyroscope detects motion about the axes. When the module is in the idle state, the gyroscope returns zero for x, y and z.

FIG. 19. is a schematic of a structural CF battery configured as a snowboard according to an embodiment of the disclosure. A portion of or the entire carbon fiber frame of the snowboard 402 may be configured as a structural CF battery 1902. One or more terminals 1904 for the structural CF battery 1902 board may provide a wired interface 1906 for connection to sensors, and a wireless interface 1908 for wireless connection to an external device. A bend sensor 1912 may be positioned at one end and a bend sensor 1914 may be located at another end of the snowboard 402 to measure flexing of the snowboard 402. The bend sensor 1912 and the bend sensor 1914 may be piezoelectric sensors. Other sensors can include a gyroscope 1922, a GPS 1924, and a pressure sensor 1926. Also a load balance sensor 1928 may be included adjacent to one or more of the boot clamps 1932. In one embodiment, a load balance sensor may take the form of a pair of force sensors positioned on either side of a boot clamp 1932. Alternatively, a load balance sensor may encircle a boot clamp 1932. The load balance sensor 1928 may be configured as one or more force sensors.

Some bowling balls are being made using carbon fiber composite material as an outer surface finish material for better surface durability and aesthetics. It may be beneficial to incorporate a spin sensor in the interior of the bowling ball in order to measure player performance. However, as with other sports equipment, the sensor would require power by a battery as the power source, and the battery would greatly impact the weigh balance of the bowling ball.

Figure 20:
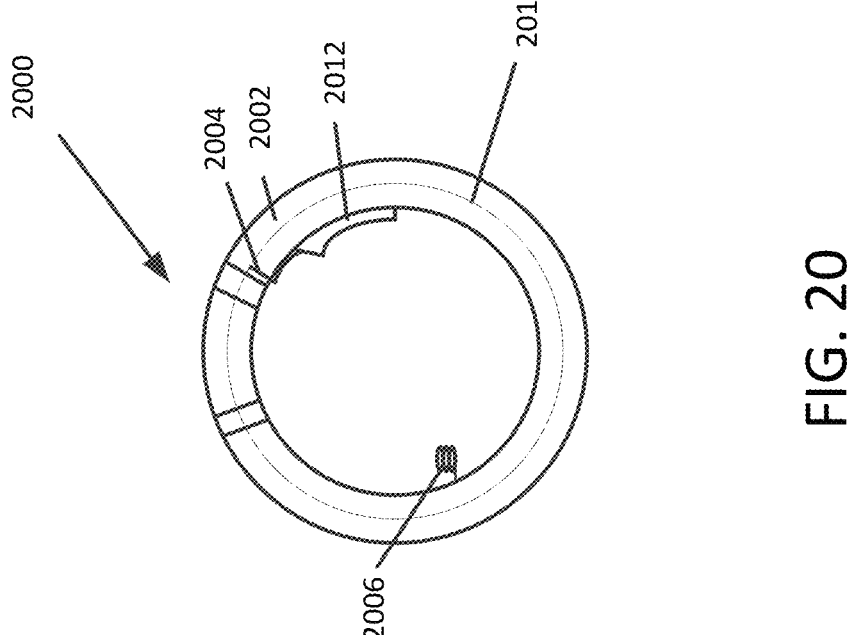
FIG. 20 is a schematic of a structural CF battery configured as a shell for a bowling ball.

FIG. 20 is a cut-out view of a bowling ball according to an embodiment of the disclosure. The bowling ball 2000 may be made of a composite material 2010 of a thickness to provide a pre-specified weight. In order to eliminate the need for a separate battery, a bowling ball 2000 can be formed using structural CF battery 2002 in place of some or all of carbon fiber composite material of the outer surface finish material. The structural CF battery 2002 can be used as the power source for embedded sensors, including a spin sensor 2012, connected by a wired connection 2004. A spin sensor 2012 may be a gyroscope sensor or the like. Sensor signals may be transmitted by way of a wireless connection coil 2006. The wireless connection coil 2006 may be arranged on an inside wall of the bowling ball 2000. In one embodiment, a portion of an inside wall of the bowling wall 2000 may include a structural CF battery.

The above description is presented to enable a person skilled in the art to make and use the embodiments and aspects of the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. In this regard, certain embodiments within the disclosure may not show every benefit of the disclosure, considered broadly.

The invention claimed is:

1. A mobile apparatus, comprising:

a motion action portion;

the motion action portion including a frame constructed of carbon fiber composite, wherein a portion of the carbon fiber composite frame is configured as a structural carbon fiber battery, the structural battery including one or more energy storage devices;

each of the one or more energy storage devices having:

at least one anode core of a continuous carbon fiber, wherein the continuous carbon fiber is a plurality of carbon filaments bundled together, an electrolyte arranged on the at least one continuous carbon fiber core, wherein the electrolyte includes an electrolyte precursor coating solution containing a lithium salt, a polymer or monomer which solvates lithium ion, a gel or elastomer matrix oligomer, a UV sensitive cross-linking agent, and a plasticizer, and a cathode layer arranged to the at least one continuous carbon fiber core on the electrolyte, wherein the cathode layer is particles of a cathode active material embedded in a matrix of a conductive polymer; and at least one interface electrically connected to the structural battery, the interface for inputting power for charging the structural battery and for outputting power.

2. A mobile apparatus, comprising:

a motion action portion;

the motion action portion including a frame constructed of carbon fiber composite, wherein a portion of the carbon fiber composite frame is configured as a structural carbon fiber battery, the structural battery including one or more energy storage devices, wherein each of the one or more energy storage devices having a laminate structure with:

at least one anode core of a plurality of continuous carbon fibers, wherein each continuous carbon fiber is a plurality of carbon filaments bundled together, an electrolyte coating arranged on the plurality of continuous carbon fibers, wherein the electrolyte includes an electrolyte precursor coating solution containing a lithium salt, a polymer or monomer which solvates lithium ion, a gel or elastomer matrix oligomer, a UV sensitive cross-linking agent, and a plasticizer, and a cathode layer arranged to the at least one anode core of the plurality of continuous carbon fibers on the electrolyte coating; and at least one interface electrically connected to the structural battery, the interface for inputting power for charging the structural battery and for outputting power.

3. The mobile apparatus of claim 1, wherein the motion action portion is a personal mobility device, the mobile apparatus further comprising at least one sensor that is powered by the structural carbon fiber battery portion of the carbon fiber composite frame.

4. The mobile apparatus of claim 3, wherein the personal mobility device comprises a global positioning system as the at least one sensor, and wherein the at least one interface is configured to power a portable emergency call device.

5. The mobile apparatus of claim 3, wherein the motion action portion is a portable object bearing member, and wherein the frame with the structural carbon fiber battery portion provides structural support for the portable object bearing member.

6. The mobile apparatus of claim 5, wherein the portable object bearing member supports a movable device, the portable object bearing member including at least one motor, powered by the structural battery, for moving the movable device.

* * * * *